(No Model.)
C. S. GIGER.
Wire Fence.
No. 240,698.  Patented April 26, 1881.
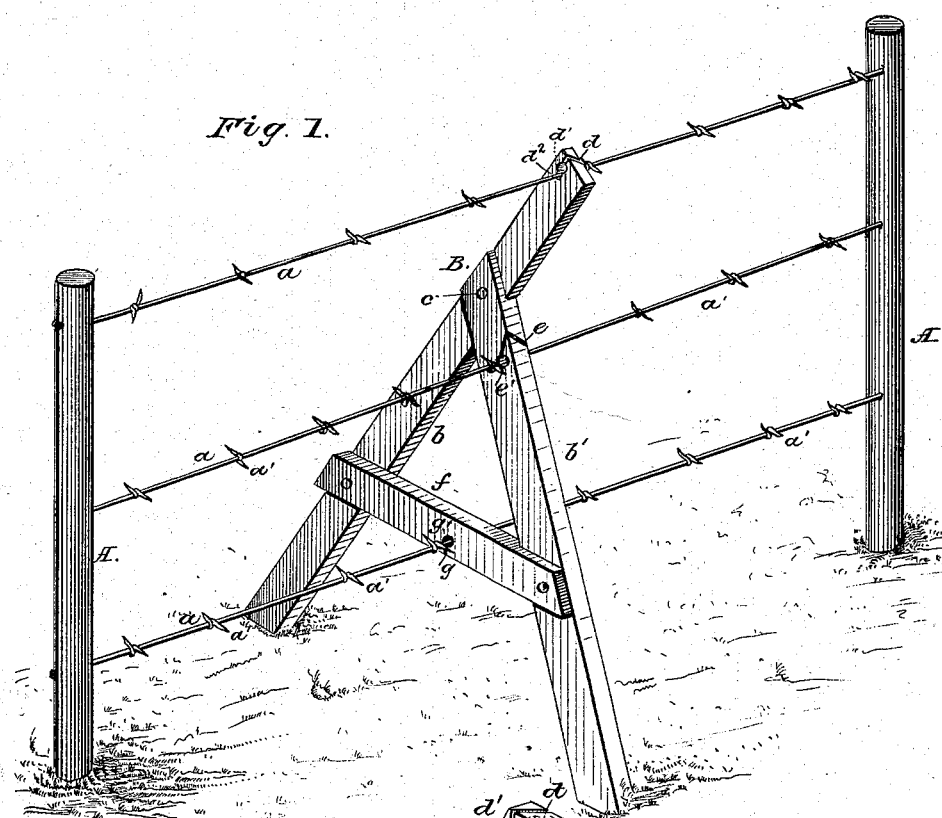
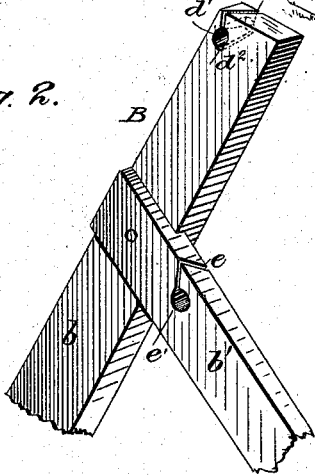

UNITED STATES PATENT OFFICE.

CHARLES S. GIGER, OF HIGHLAND, ILLINOIS.

WIRE FENCE.

SPECIFICATION forming part of Letters Patent No. 240,698, dated April 26, 1881.

Application filed January 25, 1881. (No model.)

*To all whom it may concern:*

Be it known that I, CHARLES S. GIGER, of Highland, in the county of Madison and State of Illinois, have invented a new and Improved Stock-Fence; and I do hereby declare that the following is a full, clear, and exact description of the same.

The object of my invention is to provide a portable wire stock-fence, suitable for temporarily inclosing large tracts of land in grazing districts, where it is often necessary to remove cattle from one pasture to another.

My improvement consists in a removable fence-support of novel and peculiar construction, adapted for holding the barbed wires of a stock-fence in position, as hereinafter described.

In the accompanying drawings, Figure 1 is a perspective view of my fence, showing the supports in position; and Fig. 2 a partial view of the support, showing the slot in the bottom of the topmost perforation, for holding the wire.

The posts A, which may be of any suitable material, are firmly secured to the ground at the corners of the field to be inclosed, and provided with suitable means for stretching the wires $a$. The said wires, which may be three in number, are placed at suitable intervals apart, the lowest being high enough from the ground to prevent cattle from passing under while lying down, and are provided with barbs $a'$, firmly secured thereto at suitable intervals. The barbs serve the double purpose of preventing cattle from attempting to pass through the fence, and of holding the support B in position. The said support consists of two braces, $b$ and $b'$, having their lower ends slightly set in the ground, and their upper ends inclined together and held to each other by a pin or bolt, $c$. The brace $b$ is longer than $b'$, and extends above the topmost wire, which it receives through an oblique slot, $d$, in its end leading to the horizontal perforation $d'$. The said perforation $d'$ is provided with a groove or bed, $d^2$, in its bottom, in which the wire rests when the support is in position.

The brace $b'$ is secured at its upper end to $b$, midway between the two topmost wires, and is likewise provided with an oblique slot, $e$, cut in its upper side, and leading to the perforation $e'$, which receives and holds the second wire. The two said braces are connected together, near or below their centers, by the bolted cross-piece $f$, which is provided with an oblique slot, $g$, on the under side, leading to the perforation $g'$, which receives the lowest wire. The said oblique slots are all inclined the same way, and are so made to prevent the wires from escaping from the perforations in the support when the latter is set in the ground. It will be seen that the wires cannot be removed therefrom without turning the support to one side, which, of course, occurs only when it is desired to remove the fence. At the same time the barbs assist in holding the support erect, but allow sufficient lateral movement for removing the support, when desired.

When it is desired to remove the fence from one place to another a wagon is used, provided with a series of reels upon which the wires are wound, and the braces are removed in succession.

What I claim as new is—

1. A fence-support consisting of inclined braces $b\ b'$, having slots $d\ e$, respectively, one higher than the other, leading downward to perforations, and cross-piece $f$, having slot $g$ on its under side, leading upward to perforation, substantially as and for the purpose set forth.

2. A fence-support consisting of inclined braces $b\ b'$ and cross-piece $f$, having grooved perforations and sidewise oblique slots leading thereto, in combination with the closely-arranged barbs of a wire fence, substantially as shown and described, and for the purpose set forth.

The above specification of my invention signed by me this 13th day of January, 1881.

CHARLES SHEPARD GIGER.

Witnesses:
SOLON C. KEMON,
CHAS. A. PETTIT.